(12) United States Patent
Di et al.

(10) Patent No.: US 10,755,432 B2
(45) Date of Patent: Aug. 25, 2020

(54) INDOOR POSITIONING SYSTEM AND INDOOR POSITIONING METHOD

(71) Applicant: BOE TECHNOLOGY GROUP CO., LTD., Beijing (CN)

(72) Inventors: Heliang Di, Beijing (CN); Yu Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 92 days.

(21) Appl. No.: 15/984,303

(22) Filed: May 18, 2018

(65) Prior Publication Data
US 2019/0096082 A1 Mar. 28, 2019

(30) Foreign Application Priority Data

Sep. 27, 2017 (CN) .......................... 2017 1 0890395

(51) Int. Cl.
*G06T 7/70* (2017.01)
*G06T 7/55* (2017.01)
*H04N 5/247* (2006.01)
*G06T 7/292* (2017.01)
*G06T 7/246* (2017.01)
(Continued)

(52) U.S. Cl.
CPC ................ *G06T 7/70* (2017.01); *G06T 7/246* (2017.01); *G06T 7/292* (2017.01); *G06T 7/55* (2017.01); *G06T 7/73* (2017.01); *H04N 5/247* (2013.01); *G06T 2207/10016* (2013.01); *G06T 2207/30196* (2013.01); *G06T 2207/30241* (2013.01)

(58) Field of Classification Search
None
See application file for complete search history.

(56) References Cited

U.S. PATENT DOCUMENTS 5,889,550 A * 3/1999 Reynolds .................. G01S 5/16
348/139
2007/0076096 A1* 4/2007 Alexander ............ G06T 7/0018
348/169

(Continued)

FOREIGN PATENT DOCUMENTS

CN 102749072 A 10/2012
CN 104062626 A 9/2014
(Continued)

OTHER PUBLICATIONS

First Chinese Office Action dated Jun. 5, 2019, received for corresponding Chinese Application No. 201710890395.0, 15 pages.

*Primary Examiner* — Mohammed Jebari
(74) *Attorney, Agent, or Firm* — Kinney & Lange, P.A.

(57) ABSTRACT

The present disclosure provides an indoor positioning system, which includes: N positioning lamps, M camera devices, and a processor, where N is a positive integer greater than 1 and M is a positive integer greater than or equal to 1. The N positioning lamps are arranged at different positions respectively in a room where a target to be positioned is located. The M camera devices are arranged at different positions in the room respectively, and are used for capturing a complete image of the room respectively at different angles and at the same time. The processor is configured to determine a position of the target to be positioned in the room according to the M images acquired by the M camera devices respectively at the same time.

12 Claims, 6 Drawing Sheets

(51) Int. Cl.
*G06T 7/73* (2017.01)
*H04N 21/234* (2011.01)

(56) References Cited

U.S. PATENT DOCUMENTS

| | | | | |
|---|---|---|---|---|
| 2007/0146484 A1* | 6/2007 | Horton | ............... | A63B 24/0003 |
| | | | | 348/159 |
| 2007/0152157 A1* | 7/2007 | Page | ................... | G06K 9/3216 |
| | | | | 250/340 |
| 2008/0306708 A1* | 12/2008 | Germain, IV | ....... | G01B 21/042 |
| | | | | 702/153 |
| 2009/0295755 A1* | 12/2009 | Chapman | ............... | G02B 5/124 |
| | | | | 345/175 |
| 2012/0050535 A1* | 3/2012 | Densham | ............. | H04N 5/2224 |
| | | | | 348/159 |
| 2013/0063558 A1* | 3/2013 | Phipps | ................ | H04N 5/2224 |
| | | | | 348/43 |
| 2013/0128054 A1* | 5/2013 | Densham | ........... | H04N 5/23296 |
| | | | | 348/169 |
| 2015/0195509 A1* | 7/2015 | Phipps | ................ | H04N 5/2224 |
| | | | | 348/50 |
| 2017/0019585 A1* | 1/2017 | Lytle | ................ | H04N 5/23216 |

FOREIGN PATENT DOCUMENTS

| | | |
|---|---|---|
| CN | 105738868 A | 7/2016 |
| CN | 105759244 A | 7/2016 |
| CN | 105783906 A | 7/2016 |
| CN | 106338715 A | 1/2017 |
| CN | 106371060 A | 2/2017 |
| CN | 107063266 A | 8/2017 |

\* cited by examiner

INDOOR POSITIONING SYSTEM AND INDOOR POSITIONING METHOD

CROSS REFERENCE

This application claims priority of a Chinese patent application No. 201710890395.0 filed to SIPO on Sep. 27, 2017, the entire contents of which are incorporated herein by reference.

TECHNICAL FIELD

The present disclosure relates to the field of positioning technology, and in particular to an indoor positioning system and an indoor positioning method.

BACKGROUND

In order to achieve the purpose of positioning a moving object in an indoor space, there are many indoor positioning technologies, such as, Wi-Fi, Bluetooth, Infrared, Ultra Wideband, RFID, ZigBee, and Ultrasound. The indoor positioning technology refers to using a positioning system to obtain location information (such as geographical coordinates) of an indoor moving target through a specific positioning technology.

SUMMARY

An embodiment of the first aspect of the present disclosure provides an indoor positioning system including: N positioning lamps, M camera devices, and a processor, where N is a positive integer greater than 1 and M is a positive integer greater than or equal to 1;

the N positioning lamps are arranged at different positions respectively in a room where a target to be positioned is located;

the M camera devices are arranged at different positions in the room respectively, and are used for capturing a complete image of the room respectively at different angles and at the same time; and the processor is configured to determine a position of the target to be positioned in the room according to the M images acquired by the M camera devices respectively at the same time.

In one embodiment of the present disclosure, the M camera devices are evenly distributed at the top of the room or evenly distributed at edges of the room.

In another embodiment of the present disclosure, the M camera devices are equal in height to the N positioning lamps.

In another embodiment of the present disclosure, an indicator lamp is arranged at a preset position of the target to be positioned.

In another embodiment of the present disclosure, the N positioning lamps are equal in height to the indicator lamp.

In another embodiment of the present disclosure, the height h of the M camera devices from the plane where the target to be positioned is located is greater than or equal to the height L of the N positioning lamps from the plane where the target to be positioned is located.

In another embodiment of the present disclosure, the N positioning lamps are arranged at vertexes of the room respectively.

In another embodiment of the present disclosure, the brightness of the N positioning lamps is greater than the brightness of the indoor environment.

In another embodiment of the present disclosure, the brightness of the indicator lamp is greater than the brightness of the indoor environment.

In another embodiment of the present disclosure, the processor is particularly configured to:

sequentially determine an i-th set of coordinates of the target to be positioned in a preset coordinate system according to the position of the i-th camera device and the relative positions of the positioning lamps and the target to be positioned in the acquired i-th image, where i is a positive integer greater than or equal to 1 and less than or equal to M; and determine actual coordinate values of the target to be positioned according to M sets of coordinate values of the target to be positioned.

In another embodiment of the present disclosure, if the distances between the position corresponding to the j-th set of coordinate values and each of the positions corresponding to other sets of coordinate values are all greater than a preset value, and the distances between any two of the positions corresponding to the other sets of coordinate values are all less than a preset value, the processor is further configured to determine the actual coordinate values of the target to be positioned according to the sets of coordinate values except the j-th set of coordinate values; wherein j is a positive integer greater than or equal to 1 and less than or equal to M.

In another embodiment of the present disclosure, determining, by the processor, the i-th set of coordinates of the target to be positioned in the preset coordinate system particularly includes:

analyzing the i-th image to determine relative positions of the positioning lamps in the i-th image and the target to be positioned in the i-th image;

determining the coordinate values of each of the positioning lamps in the i-th image in the preset coordinate system according to the actual position of the i-th camera device; and determining the i-th set of coordinates of the target to be positioned in the preset coordinate system according to the coordinate values of the positioning lamps in the preset coordinate system and the relative positions of the positioning lamps and the target to be positioned in the i-th image.

In another embodiment of the present disclosure, determining, by the processor, the i-th set of coordinates of the target to be positioned in the preset coordinate system particularly includes:

analyzing the i-th image to determine coordinate values of the positioning lamps in the i-th image and the target to be positioned in the i-th image;

determining a coordinate transformation formula between a coordinate system of the i-th image and the preset coordinate system according to the actual position of the i-th camera device; and converting, according to the coordinate transformation formula, coordinate values of the positioning lamps and the target to be positioned in the i-th image into coordinate values in the preset coordinate system.

A second aspect of the present disclosure provides an indoor positioning method applied in an indoor positioning system, wherein the indoor positioning system includes N positioning lamps and M camera devices, N is a positive integer greater than 1 and M is a positive integer greater than or equal to 1; the N positioning lamps are arranged at different positions respectively in a room where a target to be positioned is located; the M camera devices are arranged at different positions in the room respectively, the indoor positioning method includes:

capturing, by the M camera devices, a complete image of the room respectively at different angles and at the same time to acquire M images; and determining a position of the target to be positioned in the room according to the M images acquired by the M camera devices respectively at the same time.

In another embodiment of the present disclosure, determining the position of the target to be positioned in the room according to the M images acquired by the M camera devices respectively at the same time includes:

sequentially determining an i-th set of coordinates of the target to be positioned in a preset coordinate system according to the position of the i-th camera device and the relative positions of the positioning lamps and the target to be positioned in the acquired i-th image, where i is a positive integer greater than or equal to 1 and less than or equal to M; and determining actual coordinate values of the target to be positioned according to M sets of coordinate values of the target to be positioned.

In another embodiment of the present disclosure, if the distances between the position corresponding to the j-th set of coordinate values and each of the positions corresponding to other sets of coordinate values are all greater than a preset value, and the distances between any two of the positions corresponding to the other sets of coordinate values are all less than a preset value, determining actual coordinate values of the target to be positioned according to M sets of coordinate values of the target to be positioned includes: determine the actual coordinate values of the target to be positioned according to the sets of coordinate values except the j-th set of coordinate values, wherein j is a positive integer greater than or equal to 1 and less than or equal to M.

In another embodiment of the present disclosure, determining the position of the target to be positioned in the room according to the M images acquired by the M camera devices respectively at the same time includes:

analyzing the i-th image to determine relative positions of the positioning lamps in the i-th image and the target to be positioned in the i-th image;

determining the coordinate values of each of the positioning lamps in the i-th image in the preset coordinate system according to the actual position of the i-th camera device; and determining the i-th set of coordinates of the target to be positioned in the preset coordinate system according to the coordinate values of the positioning lamps in the preset coordinate system and the relative positions of the positioning lamps and the target to be positioned in the i-th image.

In another embodiment of the present disclosure, determining the position of the target to be positioned in the room according to the M images acquired by the M camera devices respectively at the same time includes:

analyzing the i-th image to determine coordinate values of the positioning lamps in the i-th image and the target to be positioned in the i-th image;

determining a coordinate transformation formula between a coordinate system of the i-th image and the preset coordinate system according to the actual position of the i-th camera device; and converting, according to the coordinate transformation formula, coordinate values of the positioning lamps and the target to be positioned in the i-th image into coordinate values in the preset coordinate system.

Parts of additional aspects and advantages of the present disclosure will be given in the following description, and parts will be apparent from the following description or learned through the practice of the present disclosure.

BRIEF DESCRIPTION OF THE DRAWINGS

The above and/or additional aspects and advantages of the present disclosure will become apparent and easily understood from the following description of embodiments in conjunction with the accompanying drawings, in which.

DETAILED DESCRIPTION

Figure 1:
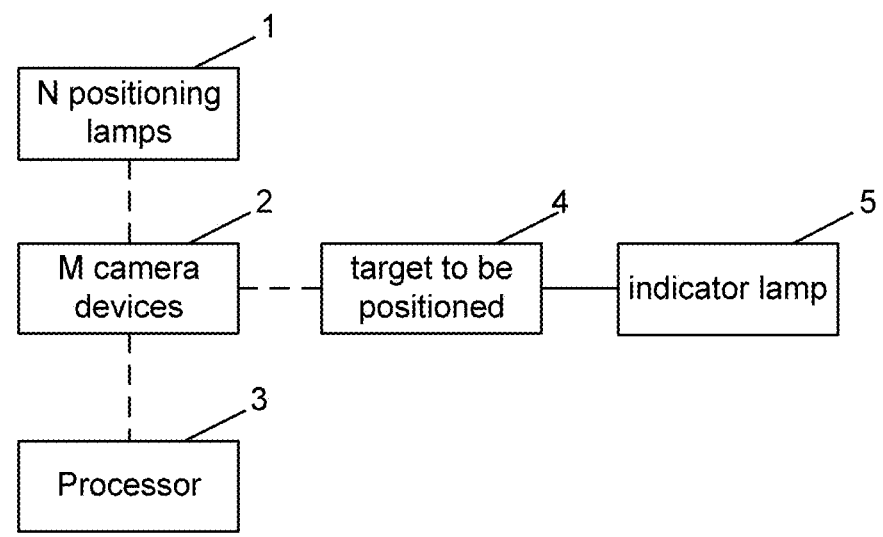
FIG. 1 is a schematic structural diagram of an indoor positioning system according to an embodiment of the present disclosure.

Embodiments of the present disclosure are described in detail below, examples of which are illustrated in the accompanying drawings, in which the same or similar reference numerals denote the same or similar elements or elements having the same or similar functions throughout. The embodiments described below with reference to the accompanying drawings are exemplary and are intended to explain the present disclosure, and should not be construed as limiting the present disclosure.

In a practical implementation, when a laser radar in the related indoor positioning technology positions an indoor moving target, it usually emits the laser as an active lamp beam, then receives the lamp beam reflected from the moving target, and determines the position of the indoor moving target according to the received lamp beam. Although the precision of the moving target position information acquired by the laser radar is high, the required cost is relatively high, and there is a certain requirement on the positioning scene, resulting in a certain limitation on the positioning range.

In the indoor positioning system according to the present disclosure, a position of a target to be positioned in a room is determined by arranging N positioning lamps and M camera devices at different positions in a room, capturing, by the M camera devices, a complete image of the target to be positioned and the N positioning lamps respectively at different angles and at the same time, and processing, by a processor, the M images acquired by the M camera devices. In this way, a simple implementation with a low cost for positioning an indoor target to be positioned is achieved, meanwhile high measurement accuracy is achieved, which satisfies the positioning requirements in different scenarios and improves the user experience.

The indoor positioning system according to the embodiment of the present disclosure will be described in detail below with reference to the accompanying drawings.

FIG. 1 is a schematic structural diagram of an indoor positioning system according to an embodiment of the present disclosure.

As shown in FIG. 1, the indoor positioning system of the present disclosure includes N positioning lamps 1, M camera devices 2, and a processor 3, where N is a positive integer greater than 1, and M is a positive integer greater than or equal to 1.

Particularly, the N positioning lamps 1 are arranged at different positions respectively in a room where a target 4 is located. In an embodiment, the brightness of the N positioning lamps 1 is greater than the brightness of the indoor environment.

The M camera devices 2 are arranged at different positions in the room respectively, and are used for capturing a complete image of the room respectively at different angles and at the same time.

The processor 3 is configured to determine a position of the target 4 to be positioned in the room according to the M images acquired by the M camera devices 2 respectively at the same time.

The target 4 to be positioned in the embodiment may be any moving object, such as a smart robot, a dog, a cat, a person, or the like.

In order to facilitate the identification of the target to be positioned, in an embodiment, an indicator lamp 5 is arranged at a preset position of the target 4 to be positioned. In another embodiment, the brightness of the indicator lamp 5 is greater than the brightness of the indoor environment.

It should be noted that the above-mentioned arranging manner of the indoor positioning system in FIG. 1 is merely an example, which does not serve as a specific limitation to this embodiment. Particularly, the N positioning lamps 1, the M camera devices 2, and the processor 3 in the indoor positioning system may be arranged at different positions according to actual application requirements, which will not be described in detail herein.

In a particular implementation, the present disclosure determines the position of the target 4 to be positioned in the room by shooting, by the M camera devices 2 at different positions in the room, the target 4 to be positioned at different angles and at the same time to obtain M complete images, then transmitting, by the M camera devices 2, the acquired M images to the processor 3 which processes the M images.

Optionally, in the embodiment, the N positioning lamps 1 are arranged at different positions in the room where the target 4 to be positioned is located, which, for example, may be vertexes, or may be edges either, and are not limited in the present disclosure.

Further, an indicator lamp 5 is set at a preset position of the target 4 to be positioned, which position may be the head, the wrist, the neck, and other parts of the target 4 to be positioned, and is not limited in the application.

The N positioning lamps 1 and the indication lamp 5 on the target 4 to be positioned may be LED (lamp Emitting Diode) lamps, or LCD (Liquid Crystal Display) lamps, etc., and are not limited in the embodiments of the present disclosure.

In addition, in order to ensure that the processor 3 can quickly and accurately position the target 4 to be positioned in the room subsequently according to the M images, in an embodiment, the brightness of the N positioning lamps 1 and the brightness of the indicator 5 on the target 4 to be positioned are set as being greater than the brightness of the indoor environment so that the processor 3, after receiving the M images sent by the M camera devices 2, may use the N positioning lamps 1 as a reference according to the N positioning lamps 1 in the M images, and then determine the actual position of the target 4 to be positioned quickly and accurately according to the position information of the reference (i.e. the N positioning lamps), thereby saving the time spent by the processor 3 in analyzing.

The brightness of the N positioning lamps 1 and the brightness of the indicator lamp 5 on the target 4 to be positioned may be set to be greater than the brightness of the indoor environment by 2 times or more than 2 times.

Particularly, when the indoor brightness is relatively low, the brightness of the N positioning lamps 1 and the brightness of the indicator lamp on the target 4 to be positioned may also be adaptively set according to the shooting performance of the M camera devices 2, which is not limited in the present application.

In addition, in the embodiment, the M camera devices 2 are arranged at different positions in the room, which may be evenly distributed at the top of the room, or may be evenly distributed at edges of the room, and are not limited in the present application.

In the embodiment of the present disclosure, the M camera devices 2 may be any hardware device having a shooting function, such as a camera, a monitoring facility, a smart phone, and the like.

Further, the scales of images that can be captured by the camera at different heights are different in a practical application. Therefore, in order to make the M images captured by the M cameras 2 have the same scale, in the present disclosure, the M cameras 2 may be arranged at the same height as the target 4 to be positioned.

In other words, when the M camera devices 2 are arranged at the same height as the target 4 to be positioned, it is possible to capture a complete image of the indoor target 4 to be positioned and the N positioning lamps 1, and the scales of the captured M images with respect to the actual size of the room is always the same, so that when the processor 3 subsequently processes the M images, it may perform the process directly, avoiding operations such as a proportional-normalization process of the M images of different scales, further saving the time required in the process, and improving the processing efficiency.

Further, after the positions of the M camera devices 2 in the room are determined in the embodiment, the areas where the M camera devices 2 can shoot are determined accordingly. As a result, in order that the M cameras 2 can capture the target 4 to be positioned and the N positioning lamps 1 completely in the M images, in the present embodiment, the height of the N positioning lamps 1 may be set to be the same as the height of the indicator lamp 5. Thus, in the M images captured by the M camera devices 2, the N positioning lamps 1 and the indicator lamp 5 on the target 4 to be positioned are at the same level, which may facilitate a subsequent positioning of the target 4 to be positioned by the processor 3.

In another embodiment of the present disclosure, the height h of the M camera devices 2 from the plane where the target 4 to be positioned is located may also set as being greater than or equal to the height L of the N positioning lamps 1 from the plane where the target 4 to be positioned is located. As a result, it may further prevent the N positioning lamps 1 from being incompletely captured when the M camera devices 2 capture images of the room.

In the indoor positioning system according to the embodiment of the present disclosure, a position of a target to be positioned in a room is determined by arranging N positioning lamps and M camera devices at different positions in the room, capturing, by the M camera devices, a complete image of the target to be positioned and the N positioning lamps respectively at different angles and at the same time, and processing, by a processor, the M images acquired by the M camera devices. In this way, a simple implementation with a low cost for positioning an indoor target to be positioned is achieved, meanwhile high measurement accuracy is achieved, which satisfies the positioning requirements in different scenarios and improves the user experience.

The working principle of the indoor positioning system will be described below in detail with reference to FIG. 2.

Figure 2:
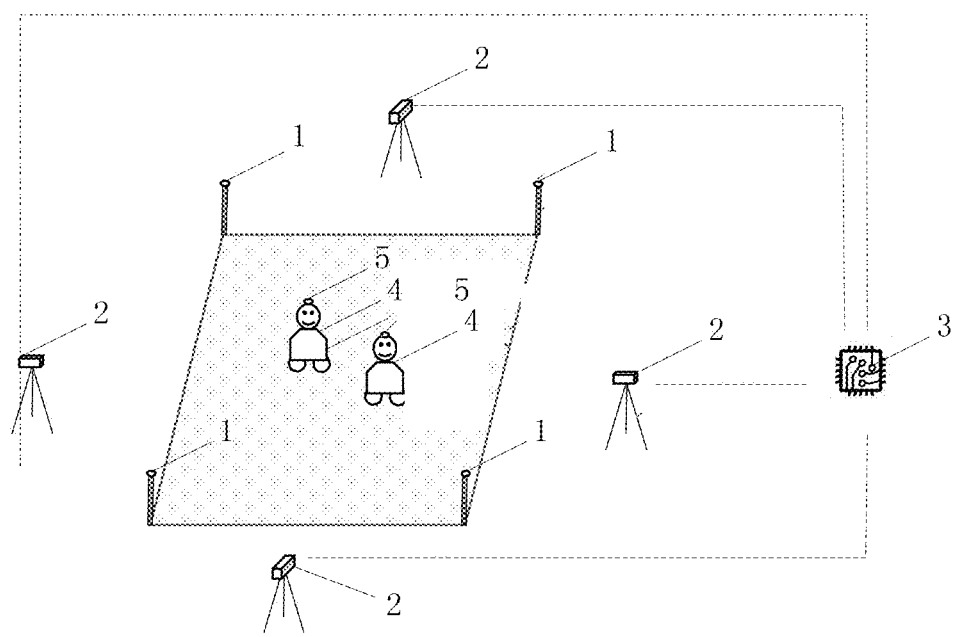
FIG. 2 is a schematic structural diagram of an indoor positioning system according to another embodiment of the present disclosure.

Here, FIG. 2 illustrates the case where the M camera devices 2 are evenly distributed at edges of a room.

Particularly, as shown in FIG. 2, the N positioning lamps 1 are evenly arranged at the vertices of the room, the M camera devices 2 are evenly arranged at edges of the room, and the heights of the N positioning lamps 1 and the M camera devices 2 are the same as the height of a plane where the target 4 to be positioned is located.

In a particular implementation, after the M camera devices 2 are turned on and capture M images at different angles and at the same time in the room, the captured M complete images may be sent to the processor 3 in real time so that the processor 3 process the M images captured by the M camera devices 2 to determine the position information of the target 4 to be positioned.

The processor 3, after receiving the M images sent by the M camera devices 2, may sequentially determine an i-th set of coordinates of the indicator lamp 5 in a preset coordinate system according to the position of the i-th camera device and the relative positions of the positioning lamps and the indicator lamp 5 in the acquired i-th image, where i is a positive integer greater than or equal to 1 and less than or equal to M; and determine the actual coordinate values of the target 4 to be positioned according to M sets of coordinates of the indicator lamp 5.

In the embodiment, the preset coordinate system refers to the spatial coordinate system of the room in which the target 4 to be positioned is located. Specifically, it may be a coordinate system established with the center point of the room as the origin, or may be a coordinate system established with any vertex in the room, where the target 4 is to be positioned is located, as the origin, which is not limited in the present application.

Specifically, the positions of the N positioning lamps 1 and the M camera devices 2 in the room are stored in the processor 3 in advance. Therefore, after the processor 3 receives the M images sent by the M camera devices 2, the processor 3 may determine the positions of the M camera devices 2 corresponding to the M images respectively according to camera device identities carried by the M images. Then, the processor 3 determines positions of the positioning lamps according to the positions of the M camera devices 2, then determines M sets of coordinates of the indicator lamp 5 in the preset coordinate system according to the relative positions of the positioning lamps and the indicator lamp 5, and then determines the actual coordinate values of the target to be positioned according to the M sets of coordinates.

In a particular implementation, the processor 3 in the embodiment first analyzes the i-th image to determine the relative positions of the positioning lamps in the i-th image and the indicator lamp 5 in the i-th image; determines the coordinate values of the positioning lamps in the preset coordinate system in the i-th image according to the actual position of the i-th camera device; and determines the i-th sets of coordinates of the indicator lamp 5 in the preset coordinate system according to the coordinate values of the positioning lamps in the preset coordinate system and the relative positions of the positioning lamps and the indicator lamp 5 in the i-th image. The above processes are repeated until the M images are processed to obtain M sets of coordinates.

Then, a weighted average calculation is performed on the calculated M sets of coordinates to obtain the actual coordinate values of the target 4 to be positioned in the room.

Further, in another embodiment of the present disclosure, when the processor 3 processes the M images to determine the actual coordinate values of the target 4 to be positioned, the processor 3 may also determine the coordinate values of the positioning lamps in the i-th image and the indicator lamp 5 in the i-th image by analyzing the i-th image; determine a coordinate transformation formula between a coordinate system of the i-th image and the preset coordinate system according to the actual position of the i-th camera device; convert, according to the coordinate transformation formula, coordinate values of the positioning lamps and the indicator lamp 5 in the i-th image into coordinate values in the preset coordinate system, and then determine the actual coordinate values of the target to be positioned according to the converted coordinate values.

Or said differently, in the embodiment, when the processor 2 determines the actual coordinate values of the target 4 to be positioned according to the M images sent by the camera devices, the coordinate system may be first converted according to the determined actual positions of the camera devices, and then the actual coordinate values of the target 4 to be positioned in the room are calculated according to the converted coordinate system.

Figure 3A:
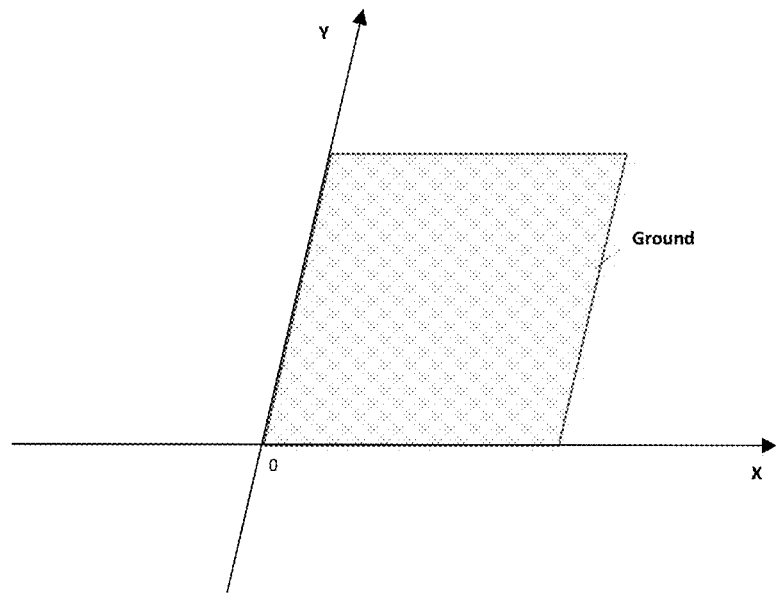
FIG. 3A and FIG. 3B are schematic diagrams of a coordinate system and a converted preset coordinate system respectively according to an embodiment of the present disclosure.
Figure 3B:
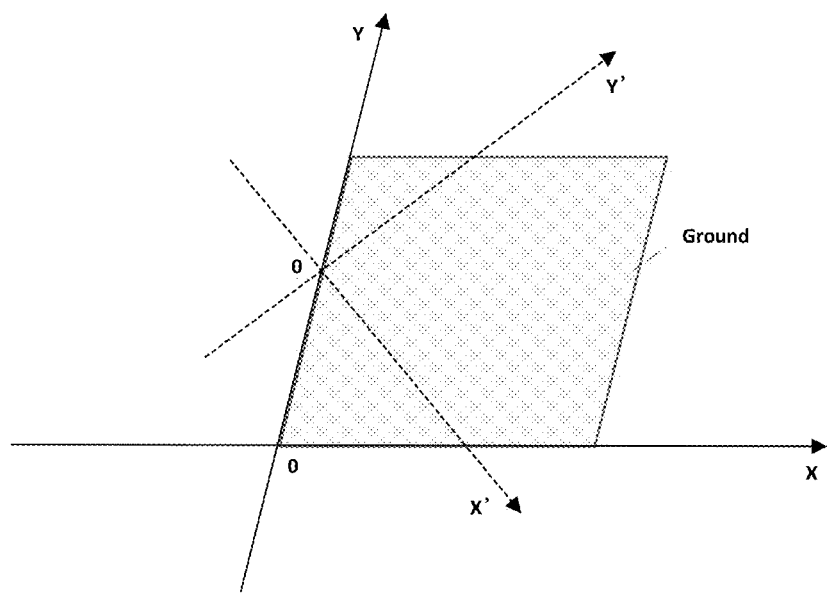

For example, in the embodiment, the coordinate system (o, X, Y) is as shown in FIG. 3A, and the preset coordinate system (0, X', Y') obtained according to the coordinate transformation formula is as shown in FIG. 3B.

Further, in an actual application, there may be a case where a position of a positioning point where an image is captured by a certain camera device in the M camera devices 2 and the positions of the positioning lamps in the image are abnormal due to an unstable installation of the camera device, thereby after the M images are processed by the processor 3, the difference between a certain set of coordinate values and other sets coordinate values is comparatively large.

Therefore, the present disclosure is made to prevent the inaccurate positioning of the target 4 to be positioned due to the presence of bad points in the M sets of coordinate values. When determining the actual coordinate value information of the target 4 to be positioned in the room based on the M images, in the present disclosure, a filtering operation is performed on the M sets of coordinate values to ensure a more accurate positioning of the target 4 to be positioned.

In a particular implementation, the processor 3 may compare the M sets of coordinate values with a preset value respectively, and if the distances between the position corresponding to the j-th set of coordinate values and each of the positions corresponding to other sets of coordinate values are all greater than a preset value, and the distances between any two of the positions corresponding to the other sets of coordinate values are all less than a preset value, the processor 3 removes the j-th set of coordinate values, and determine the actual coordinate values of the target 4 to be positioned according to the sets of coordinate values except the j-th set of coordinate values, wherein j is a positive integer greater than or equal to 1 and less than or equal to M.

In the embodiment, the preset value may be adaptively set according to an actual situation, and the disclosure does not particularly limit it.

Figure 4:
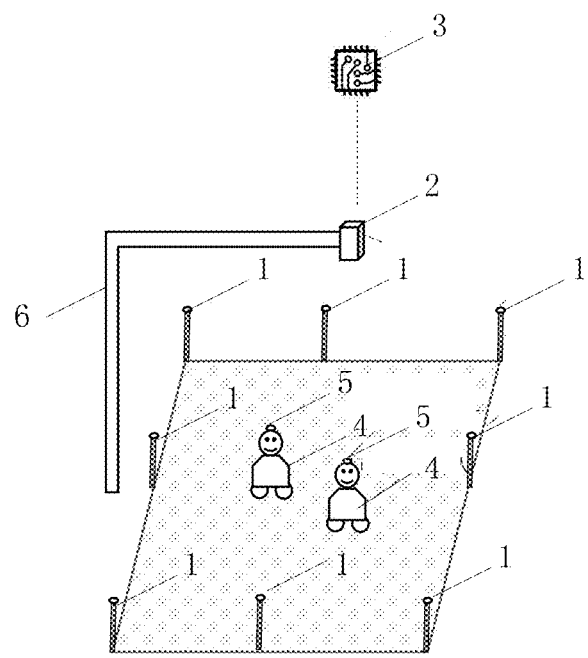
FIG. 4 is a schematic diagram of an indoor positioning system according to a further embodiment of the present disclosure.

It should be noted that the M camera devices 2 in the present disclosure may also be evenly distributed at the top of the room, as shown in FIG. 4. In order to arrange the M camera devices 2 at the top, in the embodiment, the M camera devices 2 may be arranged by mounting members 6, or the M camera devices 2 may be directly arranged at the top of the room. In the embodiment, the explanation is mainly given by taking the case that the M camera devices 2 are arranged at the top of the room by mounting members 6 as an example.

For a particular implementation, reference may be made to the execution step shown in FIG. 2 above, which will not be specifically described herein.

A scheme that the processor 3 processes the received M images to obtain the actual coordinate values of the target 4 to be positioned in the indoor positioning system of the present embodiment will be explained below in details by a particular example.

Figure 5A:
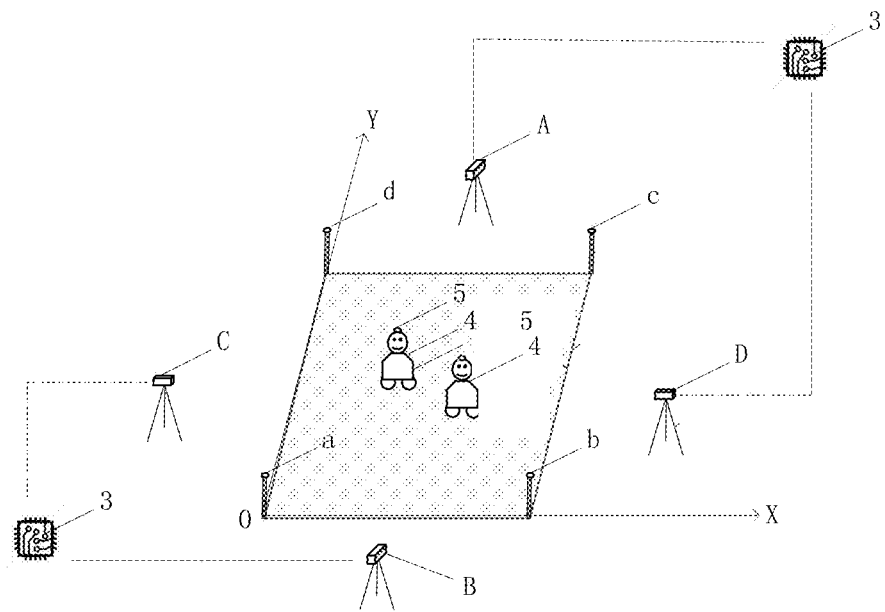
FIG. 5A is a schematic diagram of an indoor arrangement of a room in which N positioning lamps and M camera devices are arranged according to an embodiment of the present disclosure.
Figure 5B:
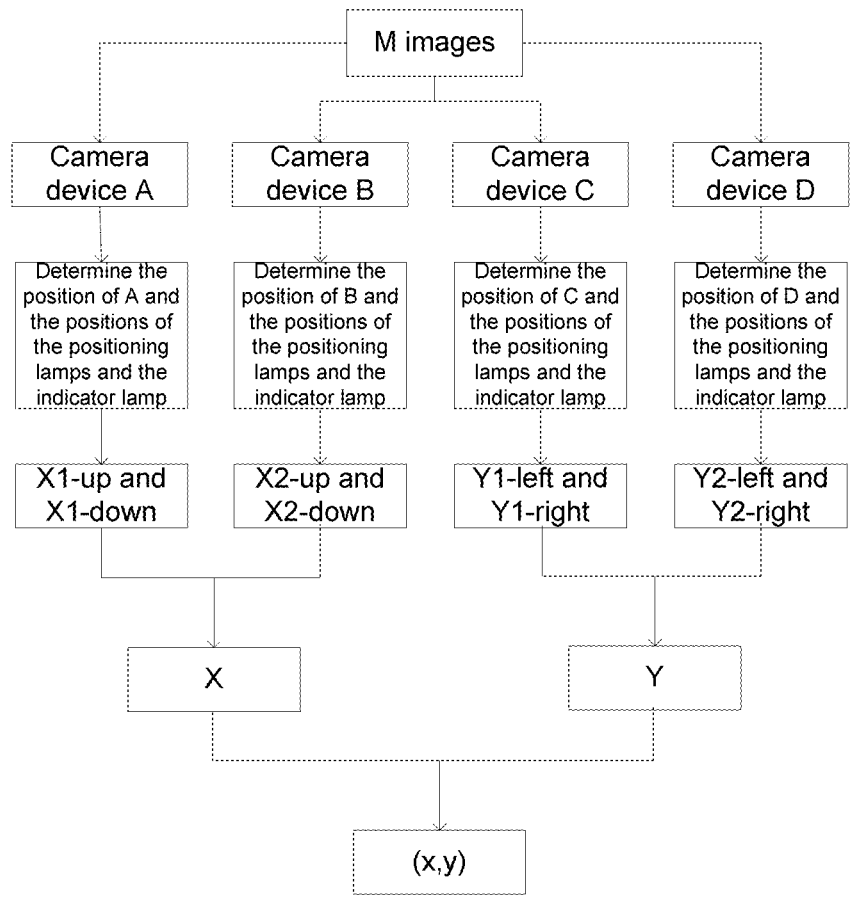
FIG. 5B is a schematic flowchart of processing, by a processor, received M images to determine actual coordinate values of a target to be positioned according to an embodiment of the present disclosure.

As shown in FIG. 5A, the number M of the camera devices 2 is 4, and the camera devices 2 are labeled A, B, C, and D. After the processor 3 receives four images sent by the four camera devices 2, it may first determine the camera devices corresponding to the four images respectively according to the four images. Then, a pre-stored relationship table of camera devices and actual position displacements is searched for the actual positions of the four camera devices 2 in the room and the relative positions of the positioning lamps and the indicator lamp 5, and thereafter the actual position of the target 4 to be positioned in the room is determined based on the determined actual positions of the four camera devices 2 and the relative positions of the positioning lamps and the indicator lamp 5.

The positioning lamps arranged at vertices of the room are marked as a, b, c, and d, respectively, wherein the coordinate system uses the positioning lamp a as the origin, the direction in which the positioning lamps a and b are set as the X axis, and the direction in which the positioning lamps a and d are set as the Y axis, as shown in FIG. 5A.

In a particular implementation, from the image sent by the camera device A, the processor 3 calculates a first horizontal coordinate value X1-up of the indicator lamp 5 based on the horizontal distance between the indicator lamp 5 and the positioning lamp c, the horizontal distance between the indicator lamp 5 and the positioning lamp d, and the ratio thereof, and further calculates a second horizontal coordinate value X1-down of the indicator lamp 5 based on the horizontal distance between the indicator lamp 5 and the positioning lamp a, the horizontal distance between the indicator lamp 5 and the positioning lamp b, and the ratio thereof.

From the image sent by the camera device B, the processor 3 calculates a third horizontal coordinate value X2-up of the indicator lamp 5 based on the horizontal distance between the indicator lamp 5 and the positioning lamp c, the horizontal distance between the indicator lamp 5 and the positioning lamp d, and the ratio thereof, and further calculates a fourth horizontal coordinate value X2-down of the indicator lamp 5 based on the horizontal distance between the indicator lamp 5 and the positioning lamp a, the horizontal distance between the indicator lamp 5 and the positioning lamp b, and the ratio thereof.

In the same way, from the image sent by the camera device C, the processor 3 calculates a first longitudinal coordinate Y1-left of the indicator lamp 5 based on the horizontal distance between the indicator lamp 5 and the positioning lamp d, the horizontal distance between the indicator lamp 5 and the positioning lamp a, and the ratio thereof, and further calculates a second longitudinal coordinate Y1-right of the indicator lamp 5 based on the horizontal distance between the indicator lamp 5 and the positioning lamp c, the horizontal distance between the indicator lamp 5 and the positioning lamp b, and the ratio thereof.

From the image sent by the camera device D, the processor 3 calculates a third longitudinal coordinate Y2-left of the indicator lamp 5 based on the horizontal distance between the indicator lamp 5 and the positioning lamp d, the horizontal distance between the indicator lamp 5 and the positioning lamp a, and the ratio thereof, and further calculates a fourth longitudinal coordinate Y2-right of the indicator lamp 5 based on the horizontal distance between the indicator lamp 5 and the positioning lamp c, the horizontal distance between the indicator lamp 5 and the positioning lamp b, and the ratio thereof.

Then, the processor 3 calculates the actual horizontal coordinate x of the indicator lamp 5 by weighted averaging X1-up, X1-down, X2-up, and X2-down, and calculates the actual longitudinal coordinate y of the indicator lamp 5 by weighted averaging Y1-left, Y1-right, Y2-left and Y2-right, so as to obtain the actual coordinate values (x, y) of the indicator lamp 5.

Further, after the actual coordinate values of the indicator light 5 are obtained, in the embodiment, the movement trajectory of the target 4 to be positioned may also be determined according to the positions of the target 4 to be positioned.

In the way, the embodiment achieves a simple implementation with a low cost when positioning the indoor target to be positioned, meanwhile also achieves high measurement accuracy, which satisfies the positioning requirements in different scenarios and improves the user experience.

Figure 6:
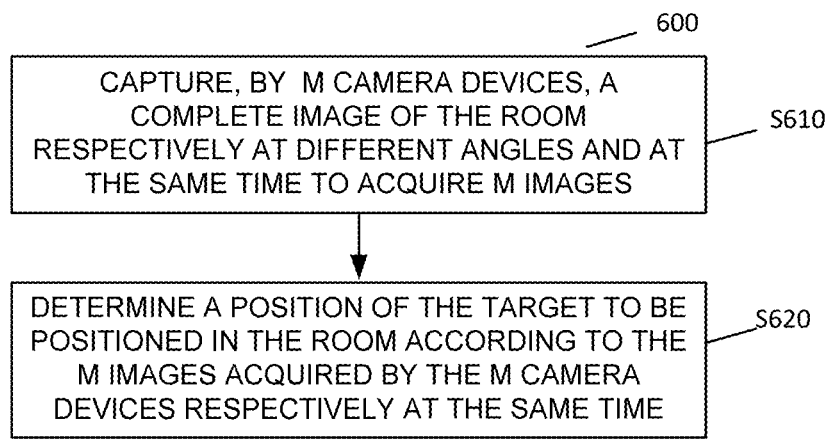
FIG. 6 is a flowchart of an indoor positioning method according to an embodiment of the present disclosure.

FIG. 6 is a flowchart of an indoor positioning method 600 according to an embodiment of the present disclosure.

The indoor positioning method 600 according to an embodiment of the present disclosure is applied in the foregoing indoor positioning system shown in FIG. 1, wherein the indoor positioning system includes N positioning lamps and M camera devices, N is a positive integer greater than 1 and M is a positive integer greater than or equal to 1. The N positioning lamps are arranged at different positions respectively in a room where a target to be positioned is located. The M camera devices are arranged at different positions in the room respectively.

As shown in FIG. 6, the indoor positioning method 600 according to an embodiment of the present disclosure includes step S610, capturing, by the M camera devices, a complete image of the room respectively at different angles and at the same time to acquire M images; and step S620, determining the position of the target to be positioned in the room according to the M images acquired by the M camera devices respectively at the same time.

Figure 7:
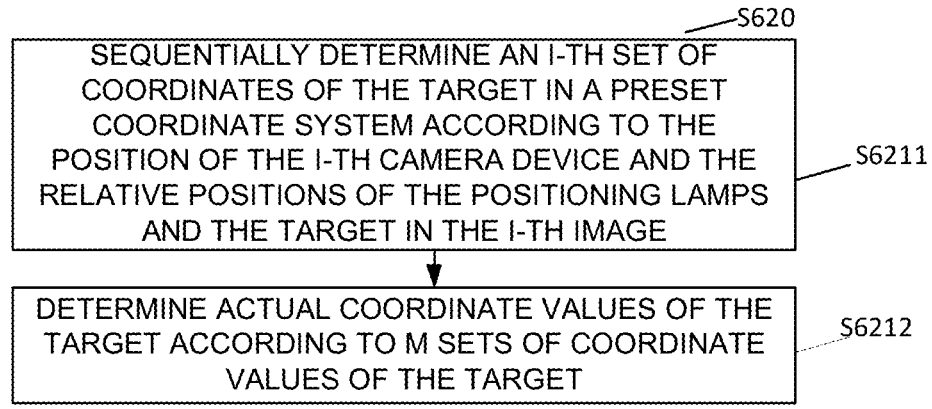
FIG. 7 is an example of a step of determining a position of the target to be positioned in a room according to M images in an indoor positioning method according to an embodiment of the present disclosure.

In an embodiment, as shown in FIG. 7, step S620 includes:

S6211, sequentially determining an i-th set of coordinates of the target to be positioned in a preset coordinate system according to the position of the i-th camera device and the relative positions of the positioning lamps and the target to be positioned in the acquired i-th image, where i is a positive integer greater than or equal to 1 and less than or equal to M; and S6212, determining actual coordinate values of the target to be positioned according to M sets of coordinate values of the target to be positioned.

In another embodiment, if the distances between the position corresponding to the j-th set of coordinate values and each of the positions corresponding to other sets of coordinate values are all greater than a preset value, and the distances between any two of the positions corresponding to the other sets of coordinate values are all less than a preset value, step S622 includes: determining the actual coordinate values of the target to be positioned according to the sets of coordinate values except the j-th set of coordinate values, wherein j is a positive integer greater than or equal to 1 and less than or equal to M.

Figure 8:
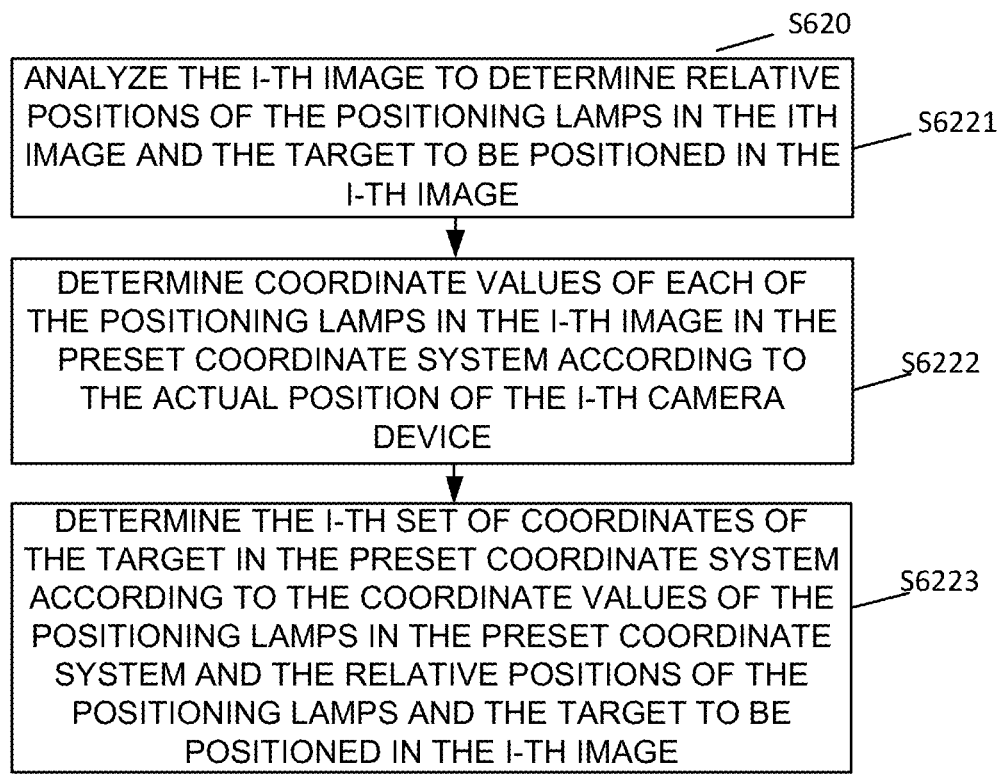
FIG. 8 is another example of a step of determining a position of the target to be positioned in a room according to M images in an indoor positioning method according to an embodiment of the present disclosure.

In an embodiment, as shown in FIG. 8, step S620 includes:

S6221, analyzing the i-th image to determine relative positions of the positioning lamps in the i-th image and the target to be positioned in the i-th image;

S6222, determining the coordinate values of each of the positioning lamps in the i-th image in the preset coordinate system according to the actual position of the i-th camera device; and S6223, determining the i-th set of coordinates of the target to be positioned in the preset coordinate system according to the coordinate values of the positioning lamps and the relative positions of the positioning lamps and the target to be positioned in the i-th image in the preset coordinate system.

Figure 9:
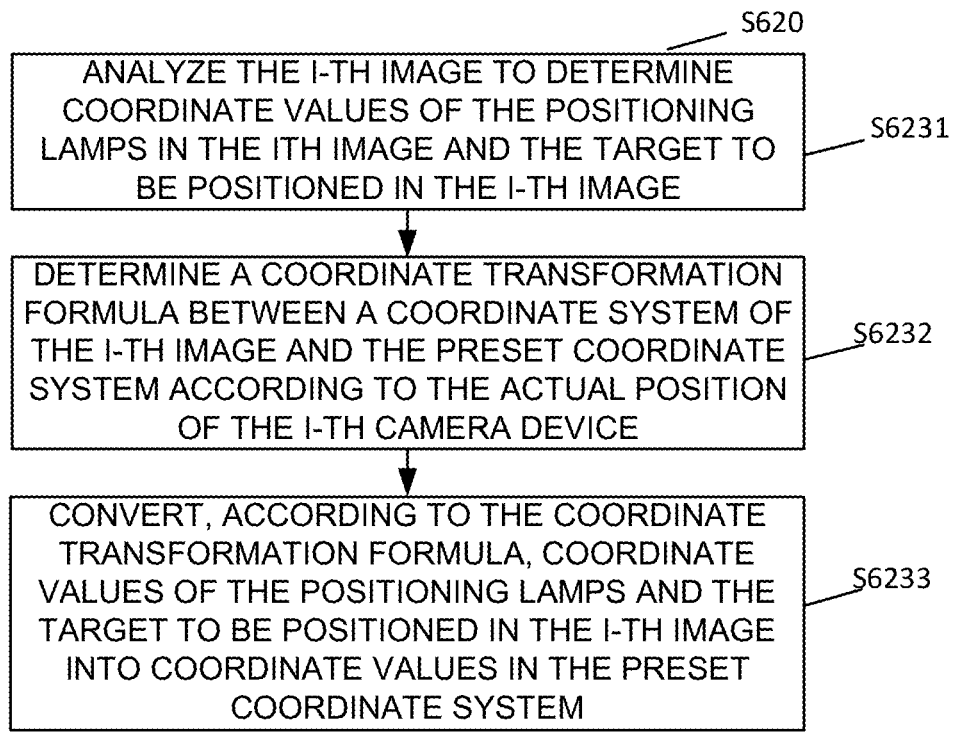
FIG. 9 is a further example of a step of determining a position of the target to be positioned in a room according to M images in an indoor positioning method according to an embodiment of the present disclosure.

In an embodiment, as shown in FIG. 9, step S620 includes:

S6231, analyzing the i-th image to determine coordinate values of the positioning lamps in the i-th image and the target to be positioned in the i-th image;

S6232, determining a coordinate transformation formula between a coordinate system of the i-th image and the preset coordinate system according to the actual position of the i-th camera device; and S6233, converting, according to the coordinate transformation formula, coordinate values of the positioning lamps and the target to be positioned in the i-th image into coordinate values in the preset coordinate system.

In the description of the present specification, the description referring to the terms "one embodiment", "some embodiments", "an example", "a specific example", or "some examples" or the like means the specific features, structures, materials, or characteristics described in conjunction with the embodiment(s) or example(s) are included in at least one embodiment or example of the present disclosure.

Furthermore, the terms "first" and "second" are used for descriptive purposes only, and should not be construed as indicating or implying relative importance or implicitly indicating the number of indicated technical features. Thus, features defined with "first", "second" may explicitly or implicitly include at least one such feature.

Any process or method described in the flowcharts or described elsewhere herein may be construed as representing modules, sections, or portions of codes that includes executable instructions of one or more steps for implementing a particular logical function or process. The scope of preferred embodiments of the present disclosure includes additional implementations in which functions may not be performed in the shown or discussed order, including in a substantially simultaneous manner or in reverse order depending on the function involved, which should be understood by those of skills in the art to which the embodiments of the present disclosure pertain.

It should be understood that portions of the present disclosure may be implemented in hardware, software, firmware, or a combination thereof. In the above implementations, a plurality of steps or methods may be implemented using software or firmware stored in a memory and executed by a suitable instruction execution system. For example, if it is implemented in hardware, as in another implementation, it may be implemented using any one or combination of the following techniques known in the art: discrete logic circuits having logic gates for implementing logic functions on data signals, application-specific integrated circuits with suitable combinational logic gates, programmable gate arrays (PGA), field programmable gate arrays (FPGA), etc.

Those of ordinary skill in the art may understand that all or part of steps carried in the foregoing method of the embodiment may be implemented by relevant hardware instructed by a program, and the program may be stored in a computer-readable storage medium. When executed, the program includes one or a combination of the steps of the method embodiments.

The above-mentioned storage medium may be a read-only memory, a magnetic disk or an optical disk, and the like. Although embodiments of the present disclosure have been shown and described above, it will be understood that the above embodiments are exemplary and should not be construed as limiting the present disclosure, and that those of ordinary skills in the art may, within the scope of the present disclosure, make changes, modifications, substitutions and variations to the above embodiments.

We claim:

1. An indoor positioning system comprising:
   N positioning lamps that are arranged at different positions respectively in a room where a target to be positioned is located, where N is a positive integer greater than 1;
   M camera devices that are arranged at different positions respectively in the room, and are used for capturing a complete image of the room respectively at different angles and at the same time, where M is a positive integer greater than or equal to 1; and
   a processor that k configured to:
      sequentially determine an i-th set of coordinates of the target to be positioned in a preset coordinate system according to the position of the i-th camera device and the relative positions of the positioning lamps and the target to be positioned in the acquired i-th image, where i is a positive integer greater than or equal to 1 and less than or equal to M, and
   determine actual coordinate values of the target to be positioned according to M sets of coordinate values of the target to be positioned, comprising:

computing the distances between any two of the positions corresponding to the sets of coordinate values of the target to be positioned;

when the distances between the position corresponding to the j-th set of coordinate values of the target to be positioned and each of the positions corresponding to other sets of coordinate values of the target to be positioned are all greater than a preset value, and the distances between any two of the positions corresponding to the other sets of coordinate values of the target to be positioned are all less than a preset value, determining actual coordinate values of the target to be positioned in the room according to M sets of coordinate values of the target to be positioned except the j-th set of coordinate values; and otherwise determining actual coordinate values of the target to be positioned in the room according to M sets of coordinate values of the target to be positioned, wherein j is a positive integer greater than or equal to 1 and less than or equal to M, wherein determining, by the processor, the i-th set of coordinates of the target to be positioned in the preset coordinate system comprises:

analyzing the i-th image to determine coordinate values of the positioning lamps in the i-th image and the target to be positioned in the i-th image;

determining a coordinate transformation formula between a coordinate system of the i-th image and the preset coordinate system according to the actual position of the i-th camera device; and converting, according to the coordinate transformation formula, coordinate values of the positioning lamps and the target to be positioned in the i-th image into coordinate values in the preset coordinate system.

2. The system of claim 1, wherein the M camera devices are evenly distributed at a top of the room or evenly distributed at edges of the room.

3. The system of claim 1, wherein the M camera devices are equal in height to the N positioning lamps.

4. The system of claim 1, wherein an indicator lamp is arranged at a preset position of the target to be positioned.

5. The system of claim 4, wherein the N positioning lamps are equal in height to the indicator lamp.

6. The system of claim 5, wherein a height h of the M camera devices from a plane where the target to be positioned is located is greater than or equal to a height L of the N positioning lamps from the plane where the target to be positioned is located.

7. The system of claim 1, wherein the N positioning lamps are arranged at vertexes of the room respectively.

8. The system of claim 1, wherein a brightness of the N positioning lamps is greater than a brightness of the indoor environment.

9. The system of claim 4, wherein a brightness of the indicator lamp is greater than a brightness of the indoor environment.

10. The system of claim 1, wherein determining, by the processor, the i-th set of coordinates of the target to be positioned in the preset coordinate system comprises: analyzing the i-th image to determine relative positions of the positioning lamps in the i-th image and the target to be positioned in the i-th image; determining the coordinate values of each of the positioning lamps in the i-th image in the preset coordinate system according to the actual position of the i-th camera device; and determining the i-th set of coordinates of the target to be positioned in the preset coordinate system according to the coordinate values of the positioning lamps in the preset coordinate system and the relative positions of the positioning lamps and the target to be positioned in the i-th image.

11. An indoor positioning method applied in an indoor positioning system, wherein the indoor positioning system comprises N positioning lamps and M camera devices, N is a positive integer greater than 1 and M is a positive integer greater than or equal to 1; the N positioning lamps are arranged at different positions respectively in a room where a target to be positioned is located; and the M camera devices are arranged at different positions in the room respectively, the indoor positioning method comprising:

capturing, by the M camera devices, a complete image of the room respectively at different angles and at the same time to acquire M images;

sequentially determining an i-th set of coordinates of the target to be positioned in a preset coordinate system according to the position of the i-th camera device and the relative positions of the positioning lamps and the target to be positioned in the acquired i-th image, where i is a positive integer greater than or equal to 1 and less than or equal to M; and determining actual coordinate values of the target to be positioned according to M sets of coordinate values of the target to be positioned, comprising:

computing the distances between any two of the positions corresponding to the sets of coordinate values of the target to be positioned;

when the distances between the position corresponding to the j-th set of coordinate values of the target to be positioned and each of the positions corresponding to other sets of coordinate values of the target to be positioned are all greater than a preset value; and the distances between any two of the positions corresponding to the other sets of coordinate values of the target to be positioned are all less than a preset value, determining actual coordinate values of the target to be positioned in the room according to M sets of coordinate values of the target to be positioned except the j-th set of coordinate values; and otherwise, determining actual coordinate values of the target to be positioned in the room according to M sets of coordinate values of the target to be positioned, wherein j is a positive integer greater than or equal to 1 and less than or equal to M, wherein determining the i-th set of coordinates of the target to be positioned in the preset coordinate system comprises:

analyzing the i-th image to determine coordinate values of the positioning lamps in the i-th image and the target to be positioned in the i-th image;

determining a coordinate transformation formula between a coordinate system of the i-th image and the preset coordinate system according to the actual position of the i-th camera device; and converting, according to the coordinate transformation formula, coordinate values of the positioning lamps and the target to be positioned in the i-tip image into coordinate values in the preset coordinate system.

12. The indoor positioning method of claim 11, wherein determining the i-th set of coordinates of the target to be positioned in the preset coordinate system comprises: analyzing the i-th image to determine relative positions of the positioning lamps in the i-th image and the target to be positioned in the i-th image; determining the coordinate values of each of the positioning lamps in the i-th image in the preset coordinate system according to the actual position of the i-th camera device; and determining the i-th set of coordinates of the target to be positioned in the preset coordinate system according to the coordinate values of the positioning lamps in the preset coordinate system and the relative positions of the positioning lamps and the target to be positioned in the i-th image.

\* \* \* \* \*